United States Patent Office 3,024,249
Patented Mar. 6, 1962

3,024,249
PRODUCTION OF ORGANIC COMPOUNDS CONTAINING METHYLOL GROUPS
Johannes Wöllner, Moers, Germany, assignor to Rheinpreussen Aktiengesellschaft für Bergbau und Chemie, Homberg, Lower Rhine, Germany, a corporation of Germany
No Drawing. Filed Aug. 4, 1958, Ser. No. 753,119
Claims priority, application Germany Aug. 7, 1957
7 Claims. (Cl. 260—340.7)

This invention relates to the hydroxymethylation of 5-acetyl-5-methyl-1,3-dioxane and to the production of novel polyhydric compounds.

The novel compounds of the invention are 1,1,3,3-tetramethylol butanol-(2) and 1,1,3,3-tetramethylol butanone-(2).

According to the invention, these novel compounds can be derived from methyl ethyl ketone and formaldehyde. These reactants can be reacted in a known manner to produce 5-acetyl-5-methyl-1,3-dioxane in good yield. The product acetyl-1,3-dioxane can then be reacted with formaldehyde to yield 5α-hydroxymethyl-β-hydroxy-propionyl)-5-methyl-1,3-dioxane, as is indicated by the following representation:

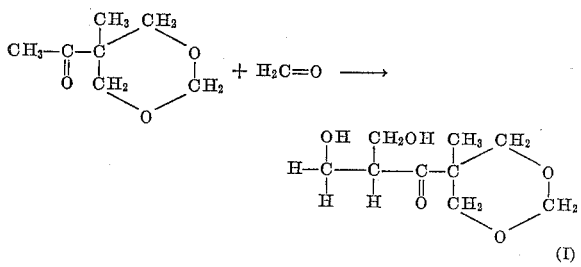

To produce the 1,1,3,3-tetramethylol butanone-(2), the propionyl-1,3-dioxane product of representation (I) can be treated to open the dioxane ring and remove formaldehyde therefrom.

To produce the 1,1,3,3-tetramethylolbutanol-(2), the propionyl-1,3-dioxane product of representation (I) can be treated to reduce the keto group and the product of the reduction can then be treated to open the dioxane ring and yield the butanol-(2).

In order that a propionyl-1,3-dioxane suitable for the purposes of the invention be obtained according to representation (I), particular reaction conditions must be observed. According to the invention, 5-acetyl-5-methyl-1,3-dioxane and formaldehyde in the mol proportions of about 3:1 to 1:3, preferably in the proportion of about 1 mol of the reactant dioxane to about 2 mols of formaldehyde are admixed in a dilute aqueous solution of these reactants. The pH of the solution is maintained in the range of about 9 to about 13, preferably in the range of about 9.5 to about 11 and the temperature is maintained in the range of 0° C. to about 100° C., preferably in the range of about 10° to about 20° C. It is common use to employ the formaldehyde as an aqueous formaline solution which contains 35 to 40 percent by weight of formaldehyde. If the 5-acetyl-5-methyl-1,3-dioxane is condensed in the surplus i.e., 1 mol of dioxane with less than 2 mols of formaldehyde, at an elevated temperature, i.e. a temperature of more than 20° C., no additional dilution with water is necessary. If, however, more than two mols of formaldehyde are used per mol of the acetyl-1,3-dioxane, preferably further 0.5 to 2 litres of water should be added to the reaction mixture per mol acetyl-1,3-dioxane. If these instructions are not observed there is obtained a heterogeneous condensation product which cannot be used for the further course of the synthesis. It is surprising that the condensation stops after the addition of 2 mols of formaldehyde, even though there is present a further active hydrogen atom in α-position to the keto group.

For the production of 1,1,3,3-tetramethylolbutanol-(2), the reduction of the keto group of the propionyl-1,3-dioxane product of representation (I) can be effected either by known methods, for instance by pressure hydrogenation with hydrogen and nickel or copper oxide chromium oxide as catalysts. Preferably, and in accordance with the invention, reduction is effected by reaction with formaldehyde and alkali or alkaline earth hydroxide. The reduction is operated as follows: One mol of the propionyl-1,3-dioxane product is mixed with one to two mols of formaldehyde (used as an aqueous solution of a formaldehyde content of 35 to 40 percent by weight) and 0.5 to 2 liters of water and heated under agitation for five to ten hours to a temperature of abou 20° to 40° C. During the heating of the reaction mixture, at least one mol of alkali hydroxide or an equivalent amount of an alkaline earth hydroxide are added to the reaction mixture in small rations. Surprisingly, under these preferred reaction conditions, no further hydroxymethylation of the 5(α-hydroxymethyl-β-hydroxy-propionyl)-5-methyl-1,3-dioxane takes place aside from the reduction of the keto group.

The propyl-1,3-dioxane produced by the reduction of the propionyl-1,3-dioxane can be converted to the 1,1,3,3-tetramethylol butanol-(2) by splitting the dioxane ring.

The splitting of 1,3-dioxane rings is known per se. It can be effected, for instance, by boiling the ring compound with phloroglucinol and a dilute acid, formaldehyde being split off. However, this method can be employed only for analytical purposes, in view of the high costs of phloroglucinol. We have found that its is very advantageous to effect the splitting of formaldehyde from the 1,3-dioxane ring by heating, preferably at a boil, 5(α,γ-dihydroxy-β-hydroxymethyl-propyl)-5-methyl-1,3-dioxane with a dilute inorganic acid, such as hydrohalogenic acids, especially hydrochloric acid, sulfuric acid or phosphoric acid in the range of concentration of 0.2 to 2 N. We have further found that the splitting of the 1,3-dioxane ring can be facilitated by adding a diol to the mixture of the aforesaid dioxane and the diluted acid. The formaldehyde which is liberated by splitting the 1,3-dioxane ring reacts with the diol under formation of a formal which forms with water an azeotropic mixture. The formal passes over as an azeotropic mixture with water. As aliphatic diols, such diols may be used the formals of which form with water azeotropic mixtures which distill below or at the boiling point of the reaction mixture, i.e. about 100° C. For an easy separation of the formal from the water, it is desirable to use such diols the formals of which were not miscible with water. Preferably, aliphatic 1,2-diols and 1,3-diols with 3 to 5 carbon atoms are used, such as 1,2-propylene glycol, 1,3-butandiol, 2-methylbutandiol(1,3) or other low molecular diols. In this case, the formal which passes over with water can be recovered as an upper layer. In this way, the diolformal can be continuously removed, and it is possible to liberate the formaldehyde practically quantitatively from the ring compound. The formal obtained as by-product can readily be converted back into glycol and formaldehyde by known methods.

The 1,1,3,3-tetramethylol butanol(2) of the invention can be produced by the method described above as a uniform viscous liquid.

The 1,1,3,3-tetramethylol butanone(2) can be produced from the propionyl-1,3-dioxane of representation (I) by admixing the propionyl-1,3-dioxane with an inorganic acid, such as sulfuric acid, phosphoric acid or hydrochloride acid, in an aqueous medium. The strength of the acid can be about 0.5 to 2 N. In regard to the splitting of the ring in this manner, it was not to be foreseen that the splitting of the dioxane ring would take place without there immediately occuring an intramolecular splitting off of water with the formation of tetrahydropyran derivatives.

Desirable, for producing the 1,1,3,-tetramethylol butanone(2) from the propionyl-1,3-dioxane, the dioxane ring is split by the procedure described above for the splitting of the propyl-1,3-dioxane ring, employing a diol in aid of the splitting reaction, for the production of the 1,1,3,3-tetramethylol butanol-(2).

The 1,1,3,3-tetramethylol butanone(2) of the invention is a crystalline material of melting point 86° C. The preparation of crystalline sugar-like compounds from methyl ethyl ketone and formaldehyde has not been previously known. Upon exhaustive hydroxymethylation in the presence of stoichiometric quantities of alkali or alkaline earth hydroxide, there is obtained as reaction product a viscous syrupy mixture of the most varied compounds from which no crystalline product can be deposited. Partial hydroxymethylation of methyl ethyl ketone with more than 2 mols of formaldehyde in the presence of catalytic quantities of alkali or alkaline earth hydroxide also fails to give any higher condensed crystalline reaction product, aside from the known preparation of 3,3-dimethylolbutanone.

The invention is further described in the following examples which are set forth as representative of the invention.

EXAMPLE I

1,1,3,3-Tetramethylol Butanol-(2)

A mixture of 1440 grams of 5-acetyl-5-methyl-1,3-dioxane (10 mols), 2000 grams of 30% formalin (20 mols) and 15 liters of water is cooled to 14° C. and brought to a pH of 10.5 by the addition drop by drop of 2 N caustic soda solution while stirring. The pH is measured by a glass-calomel electrode pair dipping into the reaction solution. After the pH of 10.5 had been maintained for 38 hours by the further addition of 2 N caustic soda solution and a temperature of 14° C., the reaction is brought to a standstill by bringing the pH to 6.5 by means of 2 N sulfuric acid. The reaction solution is concentrated in vacuum, there being obtained a residue of 2243 grams crude 5-($\alpha$-hydroxymethyl-$\beta$-hydroxypropionyl)-5-methyl-1,3-dioxane. After mixing with 2 liters of ethyl acetate, it is filtered in the hot. Upon cooling there crystallize from the filtrate 1435 grams (70.2% of the theoretical yield) of pure 5-($\alpha$-hydroxymethyl-$\beta$-hydroxypropionyl)-5-methyl-1,3-dioxane (M.P. 107–108° C., after recrystallization three times from isopropanol).

From the mother liquor, there further crystallize 208 grams (10.1% of the theoretical yield) of 5-($\alpha,\gamma$-dihydroxy-$\beta$-hydroxymethylpropyl)-5-methyl-1,3-dioxane which has been produced already during the condensation by reduction of the 5-($\alpha$-hydroxymethyl-$\beta$-hydroxypropionyl)-5-methyl-1,3-dioxane.

1435 grams of 5-($\alpha$-hydroxymethyl-$\beta$-hydroxypropionyl)-5-methyl-1,3-dioxane (7.02 mols) are dissolved in 7 liters of water and 1050 grams of 30% formalin (10.5 mole) are added. It is heated while stirring to 35° C. and 287 grams of 95% calcium hydroxide introduced over the course of 6 hours. After 8 hours it is neutralized with 2 N sulfuric acid and concentrated in vacuum. From the residue, the crude 5-($\alpha,\gamma$-dihydroxy-$\beta$-hydroxymethyl propyl) 5-methyl-1,3-dioxane (1430 grams) is obtained by extraction with isopropanol. For purification, it is recrystallized from ethyl acetate (yield 1145 grams) (M.P. 66° C. after recrystallizing 3 times from ethyl acetate).

1145 grams 5-($\alpha,\gamma$-dihydroxy-$\beta$-hydroxymethylpropyl)-5-methyl-1,3-dioxane are combined with the 208 grams obtained from the condensation and, after the addition of 1480 grams of 1,3-butanediol and 3.3 liters of 2 N sulfuric acid heated to the boiling point in a 1.5 meter packet column. In this connection, 650 cc. of 1,3-butanediol formal are separated within the course of six hours at head temperatures of 89 to 100° C. Thereupon the reaction mixture is neutralized in the flask with caustic soda solution and concentrated in vacuum. As residue there is obtained a mixture of 1,1,3,3-tetramethylolbutanol(2) and sodium sulfate, from which the polyalcohol is obtained by dissolving in isopropanol. After evaporation of the isopropanol, there are obtained 1250 grams of 1,1,3,3-tetramethylolbutanol(2) in the form of a viscous liquid of a hydroxyl number of 1150.

EXAMPLE II

Catalytic Reduction of the Butanone (2)

A solution of 500 grams of 5 ($\alpha$-hydroxymethyl-$\beta$-hydroxypropionyl)-5-methyl-1,3-dioxane in 600 cc. of isopropanol is hydrogenated under agitation in the presence of a known copper chromite catalyst in an autoclave consisting of remanit steel and having a capacity of 2 liters. At temperatures in the range of 170 and 180° C. and hydrogen pressures of 110 to 175 atmospheres pressure gauge, the reception of hydrogen is terminated after 10 hours. Then the solution is freed from the catalyst and the solvent is evaporated. There were obtained 480 grams of crude 5($\alpha,\gamma$-dihydroxy-$\beta$-hydroxymethyl-propyl)-5-methyl-1,3-dioxane. The crude product is purified by recrystallization from ethyl acetate whereby 410 grams of crystallized triol were obtained (M.P. 66° C. after recrystallizing 3 times from ethyl acetate; boiling point at 13 mm. mercury pressure: 249–251° C.

EXAMPLE III

1,1,3,3-Tetramethylolbutanone(2)

A mixture of 144 grams of 5-acetyl-5-methyl-1,3-dioxane (1 mol), 200 grams 30% formalin (2 mols) and 1.5 liters of water is cooled while stirring to 14° C. and the pH adjusted to 10.5 by the addition of about 40 to 45 cc. of 2 N sodium hydroxide solution. During a total reaction time of 38 hours, this pH is maintained by the addition of further sodium hydroxide solution and the temperature is maintained between 14 and 15° C. Thereupon the reaction mixture is neutralized with 2 N sulfuric acid and concentrated in vacuum, there being obtained a residue of 224 grams of crude 5-($\alpha$-methylol-$\beta$-hydroxypionyl)-5-methyl-1,3-dioxane. After recrystallization from ethyl acetate, there are obtained 143.5 grams of crystalline product of a melting point of 107 to 108° C.

A mixture of 204 grams of 5-($\alpha$-methylol-$\beta$-hydroxypropionyl)-5-methyl-1,3-dioxane, 225 grams butanediol-(1,3) and 500 cc. of 2 N sulfuric acid is heated to the boiling point in a 1.5 meter high packed column, heating being effected by means of an oil bath. After a short time, the azeotropic mixture of butane diol formal/water having a boiling point of 89° C. passes over at the head of the column. After condensation, this mixture separates into two layers, the upper one of which is butane diol formal. It is continuously withdrawn, the temperature at the head of the column gradually rising to 100° C. The splitting is considered complete when about 85 cc. of upper condensate layer have been removed. Thereupon the distillation residue is neutralized with concentrated sodium hydroxide solution and filtered by suction off from the precipitated sodium sulfate. The excess butane diol is removed by vacuum distillation from the residue and there is obtained a residue of 182 grams of crude 1,1,3,3-tetramethylol butanone which, for its further purification is recrystallized from acetone. There is obtained a pure 1,1,3,3-tetramethylolbutanone having a melting point of 86 to 87° C.

The 1,1,3,3-tetramethylol butanol (2) can be produced by simultaneous condensation and reduction of the acetyl-1,3-dioxane. As is shown in Example I, in the reaction of 5-acetyl-5-methyl-1,3-dioxane with formaldehyde a significant amount of 5-($\alpha,\gamma$-dihydroxy-$\beta$-hydroxymethyl propyl) 5-methyl-1,3-dioxane is produced along with the 5-(α-hydroxymethyl-β-hydroxy-propionyl)-5-methyl-1,3-dioxane which is the major product. Thus, in the condensation reaction of the acetyl to produce the propionyl a significant amount of reduction of the keto group occurs so that some of the proply is formed. This propyl can be treated in the manner described hereinbefore to split the dioxane ring and form the 1,1,3,3-tetramethylolbutanol-(2). The 1,1,3,3-tetramethylol butanol-(2) is useful as polyalcohol component for the production of alkyd resins by condensation of polyhydric alcohols with saturated and/or unsaturated polybasic carboxylic acids, such as phthalic, maleic or fumaric acid. It is further a starting material for the production of high effective explosives by nitrification of the butanol.

EXAMPLE IV

*Production of an Alkyd Resin With 1,1,3,3-Tetramethylol Butanol-(2) as Polyalcohol Component*

750 grams of linseed-oil of the acid number 3 to 4 and 260 grams of 1,1,3,3-tetramethylol butanol-(2) are heated in the presence of 0.05 gram of calcium hydroxide to 250° C. for one hour, thereafter one part of the reaction mixture is soluble in four parts of 96 percent ethanol at 20° C. After the mixture has cooled to 160° C., 510 grams of phthalic acid anhydride and 100 grams of 1,1,3,3-tetramethylol butanone-(2) are added. The mixture is, in consideration of the formation of foam slowly heated to 200° C. After two hours, 3 grams of triphenylphosphite are added. After a further reaction time of 10 to 14 hours at 200° C., the reaction mixture has an acid number of 8 and a viscosity of 35 seconds (measured as flow out time of a 50 percent by weight solution of the reaction product in toluene out of the Din 4 cup at 20° C. For this measuring, a flow out cup according to the German standard DIN 53211 is used).

The produced linseed-oil modified alkyd resin is dissolved in the usual lacquer solvents, siccativated with 0.4 percent by weight of lead (as naphthenate of lead) and 0.04 percent by weight of cobalt (as naphthenate of cobalt). This lacquer composition, coated on wood, glass, or metal surface in a layer of a thickness of 50μ, begins to dry after 30 minutes, is dust-dry after 90 minutes and completely dried after 12 to 15 hours. The lacquer films coated on thin steel plates, show after heat-alteration better values of elasticity than analogous alkyd resins formed with pentaerythritol as polyalcohol component.

1,1,3,3-tetramethylol-butanone-(2) forms with acroleine a di-allydene compound which may be incorporated in polyester resins as a most useful component, which grants to the polyester resins the characteristic quality to dry oxidatively. In a similar way effects the tetraallyl ether of the 1,1,3,3-tetramethylol butanone-(2) which can be prepared after methods of the etherification of alcohols as known per se.

EXAMPLE V

*Production of Di-Allydene-1,1,3,3-Tetramethylol-Butanone-(2)*

1 mol of 1,1,3,3-tetramethylolbutanone-(2) is heated to boiling under reflux for 20 hours together with 4 mols of acreleine in the preesnce of 0.05 mol of oxalic acid. Thereupon the reaction mixture is neutralized with sodium hydroxyde solution and the remaining acroleine is distilled off. From the residue the di-allydene compound is separated by distillation from the monoallydene compound formed simultaneously but to a smaller amount.

EXAMPLE VI

*Production of an Oxidatively Drying Polyester Resin*

An unsatured polyester is produced by the reaction of 1.2 mols of maleic acid anhydride and 0.8 mol of phthalic acid anhydride with 2.2 mols of 1,2-propylene glycol. The condensation reaction is continued till the reaction product shows an acid number of 38 to 40. 2 parts by weight of this polyester are mixed with 1 part by weight of styrene and 1 part by weight of di-allydene 1,1,3,3-tetramethylol butanone-(2). Then 0.8 percent by weight of a 50 percent by weight methyl ethyl ketone peroxide solution in dimethyl phthalate and 4 percent by weight of a solution of cobalt octoate in styrene (with 1 percent by weight of cobalt content) is added. From this composition, a film of a thickness of 0.1 mm. is coated on a glass plate. After a cold hardening of 24 hours, the film showed a smooth, non-sticky surface.

I claim:
1. The method according to claim 6, the pH of the solution being maintained in the range of about 9.5 to about 11.
2. The method according to claim 6, the temperature being maintained in the range of about 10° to about 20° C.
3. The compound 5-(α-hydroxymethyl-β-hydroxypropionyl)-5-methyl-1,3-dioxane.
4. The method according to claim 7, the reactant dioxane, formaldehyde, and alkaline material being admixed in an aqueous medium.
5. The compound 5(α,γ-dihydroxy-β-hydroxymethyl propyl) 5-methyl-1,3-dioxane.
6. Method of producing 5-(α-hydroxymethyl-β-hydroxypropionyl)-5-methyl-1,3-dioxane which comprises reacting an aqueous solution of 5-acetyl-5-methyl-1,3-dioxane and an aqueous solution of formaldehyde in the mol proportions of about 3:1 to 1:3, maintaining the pH of the solution in the range of about 9 to about 13 and the temperature at from 0 to 100° C. and recovering the 5-α-hydroxymethyl-β-hydroxypropionyl)-5-methyl-1,3-dioxane formed.
7. Method of producing 5-(α-γ-dihydroxy-β-hydroxymethylpropyl)-5-methyl-1,3-dioxane, which comprises reacting 5-(α-hydroxymethyl-β-hydroxypropionyl)-5-methyl-1,3-dioxane and formaldehyde in the mol proportions of about 1:1 to 2 and at least 1 mol of an alkaline material which is a member selected from the group consisting of alkali metal hydroxides and alkaline earth metal hydroxides, at a temperature of about 20 to 40° C, and recovering the 5-(α-γ-dihydroxy-β-hydroxy-methylpropyl)-5-methyl-1,3-dioxane formed.

References Cited in the file of this patent
UNITED STATES PATENTS

| | | |
|---|---|---|
| 2,378,988 | Dreyfus et al. | June 26, 1945 |
| 2,394,848 | Doumani | Feb. 12, 1946 |
| 2,406,713 | Senkus | Aug. 27, 1946 |
| 2,421,862 | Arundale | June 10, 1947 |

FOREIGN PATENTS

| | | |
|---|---|---|
| 1,030,837 | Germany | May 29, 1958 |